(12) United States Patent
Cui et al.

(10) Patent No.: US 12,352,565 B2
(45) Date of Patent: Jul. 8, 2025

(54) METHOD AND DEVICE FOR MEASURING r-VALUE OF TUBE IN CIRCUMFERENTIAL DIRECTION

(71) Applicant: Harbin Institute of Technology, Harbin (CN)

(72) Inventors: Xiaolei Cui, Harbin (CN); Shijian Yuan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 376 days.

(21) Appl. No.: 18/108,888

(22) Filed: Feb. 13, 2023

(65) Prior Publication Data

US 2024/0068793 A1    Feb. 29, 2024

(30) Foreign Application Priority Data

Aug. 25, 2022 (CN) .......................... 202211022806.1

(51) Int. Cl.
    *G01L 19/00*      (2006.01)
    *G01B 3/34*      (2006.01)
    (Continued)

(52) U.S. Cl.
    CPC ................. *G01B 5/12* (2013.01); *G01B 3/34* (2013.01); *G01B 5/00* (2013.01); *G01B 5/0002* (2013.01);
    (Continued)

(58) Field of Classification Search
    CPC .... G01B 5/12; G01B 3/34; G01B 5/06; G01L 1/2287; G01L 19/0092
See application file for complete search history.

(56) References Cited

U.S. PATENT DOCUMENTS 4,716,767 A  *  1/1988  Krawchuk ............... G01N 3/08
                                                                73/834

FOREIGN PATENT DOCUMENTS

CN         103698212 A  *  4/2014
CN         112033804 A  *  12/2020  ............... G01N 3/08
WO   WO-2022101606 A1  *  5/2022  .......... G01M 5/0025

OTHER PUBLICATIONS english translation of CN-112033804 accessed from worldwide.espacenet.com.*

(Continued)

*Primary Examiner* — Kristina M Deherrera
*Assistant Examiner* — Jean F Morello
(74) *Attorney, Agent, or Firm* — CARTER, DELUCA & FARRELL LLP

(57) ABSTRACT

A method for measuring an r-value of a tube in a circumferential direction: determine a size of an annular sample, and cutting the sample from a to-be-measured tube; making speckles or circular grids on an outer surface of the sample; sleeving the annular sample in a middle of an outside of a ring segmented rigid die; filling a liquid bag with a fluid medium and controlling an internal pressure, and driving the ring segmented rigid die to move outward uniformly in a radial direction using a uniformly distributed load generated by pressurizing the liquid bag, so as to cause equal diameter bulging of the annular sample; measuring strain in width and circumferential directions in a speckle or circular grid region on the annular sample; and determining the plastic strain ratio of the tube in the circumferential direction according to the strain in the width and circumferential directions.

9 Claims, 8 Drawing Sheets

(51) Int. Cl.
*G01B 5/00* (2006.01)
*G01B 5/06* (2006.01)
*G01B 5/12* (2006.01)
*G01L 1/22* (2006.01)

(52) U.S. Cl.
CPC .............. *G01B 5/06* (2013.01); *G01L 1/2287* (2013.01); *G01L 19/0092* (2013.01)

(56) References Cited

OTHER PUBLICATIONS english translation of CN-103698212 accessed from worldwide. espacenet.com.*

* cited by examiner

METHOD AND DEVICE FOR MEASURING r-VALUE OF TUBE IN CIRCUMFERENTIAL DIRECTION

CROSS REFERENCE TO RELATED APPLICATION

This patent application claims the benefit and priority of Chinese Patent Application No. 202211022806.1, filed with the China National Intellectual Property Administration on Aug. 25, 2022, the disclosure of which is incorporated by reference herein in its entirety as part of the present application.

TECHNICAL FIELD

The present disclosure relates to the field of mechanical property testing of tubes, and in particular, to a method and device for measuring an r-value of a tube in a circumferential direction.

BACKGROUND

Complex thin-walled tubular components with curved contours have been widely used in aerospace and automotive fields because of their lightweight and high performance. Such components are usually manufactured by advanced technology such as hydroforming, and are subjected to complex stress during manufacturing, which is easy to produce wrinkles and cracks. Therefore, it is always the goal of scientific research and industry to accurately simulate the forming process of complex thin-walled structural components with curved contours using the finite element method, so as to predict possible defects during forming quickly and accurately and determine reasonable process parameters, and shorten the product development cycle and reduce the die manufacturing cost. However, in order to improve the accuracy of finite element simulation, the plastic constitutive relation of the tubes shall be obtained accurately. During preparation (extrusion, drawing, rolling or rolling & welding), the macroscopic mechanical properties of the initial tube blank show obvious anisotropy in different directions due to the texture orientation. The plastic strain ratio r-values of the tubes in axial and circumferential directions are important parameters for the construction of plastic constitutive relation model. Whether the r-value of the tube can be obtained accurately is very important for the accurate construction of plastic constitutive relation of the tube, the description of deformation behavior of the tube, the improvement of simulation accuracy and the selection of reasonable forming process parameters.

However, due to the special geometric structure of the tubes, it is impossible to test its r-value by the uniaxial tensile test in any direction like the sheet. At present, only the plastic strain ratio of the tube in the axial direction (0°) can be obtained by using a method similar to that of the uniaxial tensile test of the sheet (GB/T 5027-2016). It is very difficult to measure the r-values in other directions. In the paper entitled "On constructive modeling of aluminum alloys for tube hydroforming application" published in the International Journal of Plasticity, a top international journal, after the tube blank is flattened into a flat sheet, samples are made in different directions for testing. Then, the plastic strain ratio r-value in any direction of the tube surface can be measured by referring to the existing uniaxial tensile standard for sheet. However, the mechanical properties of the tube blank have changed due to obvious work hardening during flattening, and the test results cannot accurately reflect the true anisotropic properties of the original tube blank. For the circumferential (90°) direction of the tube, the D-shaped block die, the hydraulic bulging tube blank or the three-jaw chuck are commonly used to drive the sample to carry out circumferential tension to test the r-value (patents ZL200610010154.4, ZL201310722088.3 and ZL201510267394.1). Although this method can ensure the equal diameter expansion of the sample, the r-value obtained is more direct and reliable than that obtained by uniaxial tension after flattening, and avoids the error caused by the approximate replacement of an axial r-value, it still cannot overcome the influence of friction, resulting in a large error of test results. The researchers proposed a theoretical prediction method of r-values of the tube blank in different directions, established the relation between the plastic strain ratio of the tube in any direction and the yield criterion, and determine the undetermined coefficient of the yield criterion through the data of the hydraulic bulging test of the tube. Finally, the plastic strain ratio r-value is calculated by the yield criterion (patents ZL201911186112.X, ZL201911186245.7 and ZL201911186251.2). The plastic strain ratio r-value (patent No. ZL201911186271.X) can also be obtained by substituting the stress ratio and strain increment ratio obtained from the axial uniaxial tensile test and two sets of biaxial loading tests into the above relation. On the one hand, the above theoretical method is affected by the non-equal diameter expansion deformation caused by hydraulic bulging. On the other hand, the measurement accuracy of r-value is affected by the accuracy of the selected yield criterion, and the parameters of yield criterion are not easy to measure accurately. In the process of determining the yield criterion parameters, the plastic strain ratio r-value of the tube blank is required. The principle of this method is paradoxical, which also leads to the uncertainty of the test results. Therefore, it is urgent to establish a method and device that can directly and accurately measure the plastic strain ratio r-values of the tubes in different directions (especially in the circumferential direction), which has important theoretical significance for accurately constructing the plastic constitutive relation of the anisotropic thin-walled tube blank and realizing high-precision simulation of forming of the thin-walled tubular components.

SUMMARY

An objective of the present disclosure is to provide a method and device for measuring an r-value of a tube in a circumferential direction, so as to solve the problems existing in the above prior art, and accurately construct an anisotropic plastic constitutive model of the tube and realize high-precision numerical simulation of forming of a thin-walled tubular component.

To achieve the above objective, the present disclosure provides the following solutions:

The present disclosure provides a method for measuring an r-value of a tube in a circumferential direction. A ring segmented rigid die is driven to move outward uniformly in a radial direction using a uniformly distributed load generated by pressurizing a liquid bag, so as to cause equal diameter bulging of the annular sample of the tube. During bulging, strain in the width and circumferential directions of a certain region on the annular sample is measured, and thickness-direction strain is calculated according to a principle of a constant volume for plastic deformation to determine the r-value of the tube in the circumferential direction. The method specifically includes the following steps:

step S1: determine a size of an annular sample according to a diameter and wall thickness of a to-be-measured tube, and cutting the annular sample from the tube;

step S2: making speckles or printing circular grids on an outer surface of the annular sample;

step S3: sleeving the annular sample in a middle of an outside of a ring segmented rigid die;

step S4: filling a liquid bag with a fluid medium and controlling an internal pressure, and driving the ring segmented rigid die to move outward uniformly in a radial direction using a uniformly distributed load generated by pressurizing the liquid bag, so as to cause equal diameter bulging of the annular sample;

step S5: measuring strain in width and circumferential directions on the annular sample in a single module region of the ring segmented rigid die; and step S6: determining the plastic strain ratio r-value of the tube in the circumferential direction according to the strain in the width and circumferential directions in combination with a condition of a constant volume for plastic deformation.

Optionally, the to-be-measured tube is a metal tube or non-metal tube, and the to-be-measured tube has a thickness of 0.1-20 mm.

Optionally, a width $B_0$ and a diameter $D_0$ of the annular sample meet $B_0/D_0 \leq 1/10$.

Optionally, in step S3, a lubricant is sprayed or a lubricating layer such as polytetrafluoroethylene (PTFE) is arranged between the ring segmented rigid die and the annular sample, or a microstructure is prefabricated on an outer surface of the ring segmented rigid die, so as to minimize the influence of friction and improve the uniformity of deformation.

Optionally, in step S2, the outer surface of the annular sample is sprayed with white matte paint within a range of at least 60° to form a white background completely covering the surface, and the speckles are uniformly sprayed on the white background with black matte paint, and in step S5, the strain in the width and circumferential directions on the surface of the sample are tested in real time using a full-field three-dimensional strain measurement and analysis system (digital image correlation (DIC)) during deformation of the annular sample.

Optionally, in step S2, the circular grids with a diameter of 1-5 mm are printed on the surface of the sample by an electrolytic corrosion method, and in step S5, the strain in the width and circumferential directions on the surface of the annular sample is obtained using a grid strain analysis and testing system.

The present disclosure further provides a device for measuring an r-value of a tube in a circumferential direction, including a strain measurement and data acquisition system and a ring segmented rigid die for nesting an annular sample externally. A liquid bag is placed inside the ring segmented rigid die, and an initial outer diameter and length of the liquid bag are the same as an inner diameter and length of the ring segmented rigid die. An upper limit plate and a lower limit plate are symmetrically arranged at both ends of the ring segmented rigid die. Positions of the upper limit plate and lower limit plate are limited by a moving beam of a universal testing machine or other limiting mechanisms to avoid bulge of both ends of the liquid bag during pressurization. The ring segmented rigid die and the liquid bag are clamped between the upper limit plate and the lower limit plate. The liquid bag is externally connected with a pressurizing and control system. The pressurizing and control system is able to apply a fluid medium inside the liquid bag. The ring segmented rigid die is driven to move outward uniformly in a radial direction using a uniformly distributed load generated by pressurizing the liquid bag, so as to cause equal diameter bulging of the annular sample when the ring segmented rigid die moves outward. The strain measurement and data acquisition system is able to measure strain on a surface of the annular sample, so as to calculate the r-value of the tube in the circumferential direction.

Optionally, the liquid bag is a cylindrical elastic sac with one end closed and the other end provided with a liquid filling port, and its thickness shall be set to ensure that it is not extruded from the gap between the segmented rigid die during bulging. The pressurizing and control system includes a pressurizer, a pressure control system and a fluid pressure sensor. The liquid filling port of the liquid bag is connected with the pressurizer through a tubing.

Optionally, a number of segments N of the ring segmented rigid die is at least 8, and N≥12 is usually recommended.

Compared with the prior art, the present disclosure has the following technical effects:

The present disclosure accurately measures the plastic strain ratio r-value of the tube in the circumferential direction by equal diameter bulging of the annular sample driven by the ring segmented rigid die under the uniformly distributed load generated by pressurizing the liquid bag. Compared with the existing method, the present disclosure can directly measure the r-value of the tube in the circumferential direction, which is not affected by the yield criterion, and the testing process is simple. In addition, the circumferential and axial curvature radii of the measuring region of the annular sample of the tube do not change during equal diameter bulging process, eliminating the influence of non-equal diameter expansion deformation on the measurement of the r-value. The uniaxial tensile deformation of the annular sample of the tube in the circumferential direction is realized using uniform pressurization and equal diameter bulging. By reasonably designing the width of annular sample and the number of segments of the ring segmented rigid die, and designing the lubricating layer between the annular sample and the ring segmented rigid die or prefabricating the microstructure on the surface of the ring segmented rigid die, the friction effect between the sample and the rigid die is significantly reduced, and the measurement accuracy of r-value of the tube blank in the circumferential direction is greatly improved.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

FIG. 2-1 is a schematic diagram of an intermediate deformation stage of testing the r-value of the tube in the circumferential direction through uniform pressurization and equal diameter bulging in the embodiment of the present disclosure;

FIG. 2-2 shows a stress state of the tube during uniform pressurization and equal diameter bulging in the embodiment of the present disclosure;

REFERENCE NUMERALS

1—upper limit plate; 2—ring segmented rigid die; 3—annular sample; 4—pressurizing fluid; 5—liquid bag; 6—lower limit plate; 7—pressurizer; 8—pressure control system; 9—fluid pressure sensor; 10—strain measurement and data acquisition system; 11—lubricating layer; and 12—surface microstructure.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and device for measuring an r-value of a tube in a circumferential direction, so as to solve the problems existing in the above prior art, and accurately construct an anisotropic plastic constitutive model of the tube and realize high-precision numerical simulation of forming of a thin-walled tubular component.

In order to make the above objectives, features and advantages of the present disclosure more obvious and understandable, the present disclosure is further described in detail in combination with the attached drawings and specific embodiments.

The present disclosure provides a method and device for directly measuring a plastic strain ratio r-value of a tube in a circumferential direction through uniform pressurization and equal diameter bulging, which directly and accurately measures the r-value of the tube in the circumferential direction, and provides accurate parameters for constructing the anisotropic plastic constitutive relation of the tube and realizing high-precision numerical simulation of forming of the thin-walled tubular component.

Specific Solution I

Figure 1:
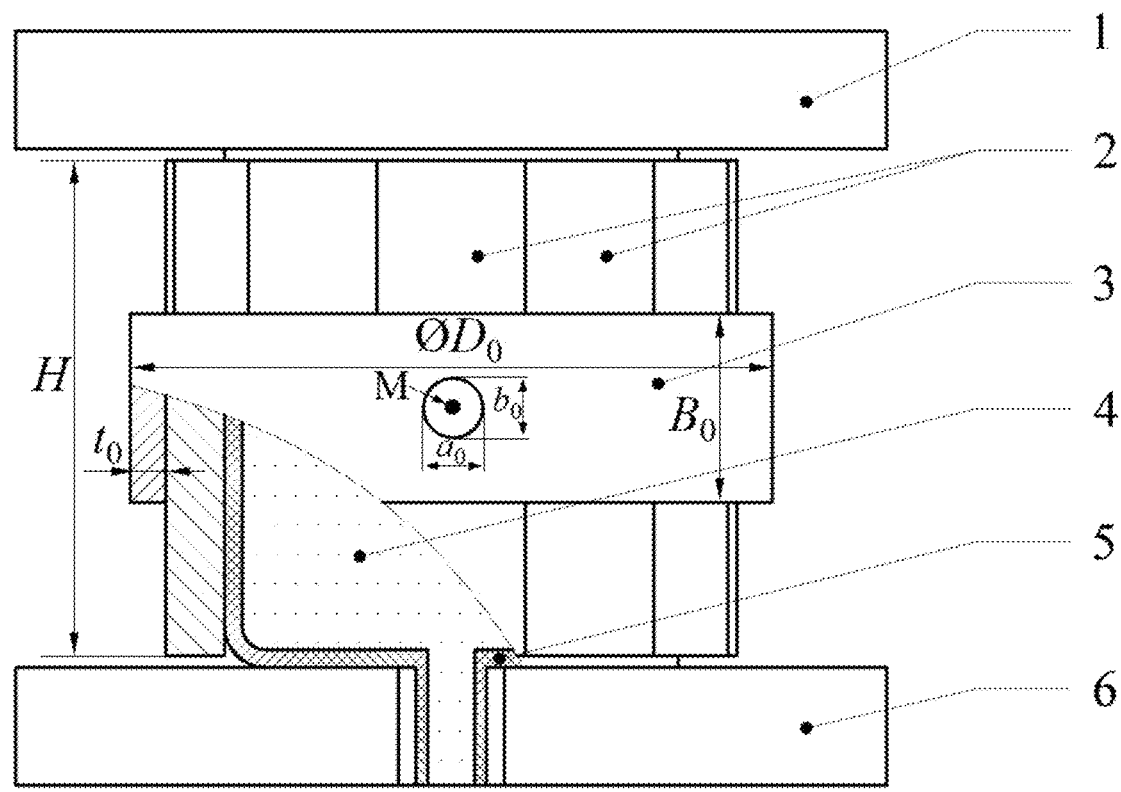
FIG. 1 is a schematic diagram of an initial stage of testing an r-value of a tube in a circumferential direction through uniform pressurization and equal diameter bulging in an embodiment of the present disclosure.
Figures 1, 2:
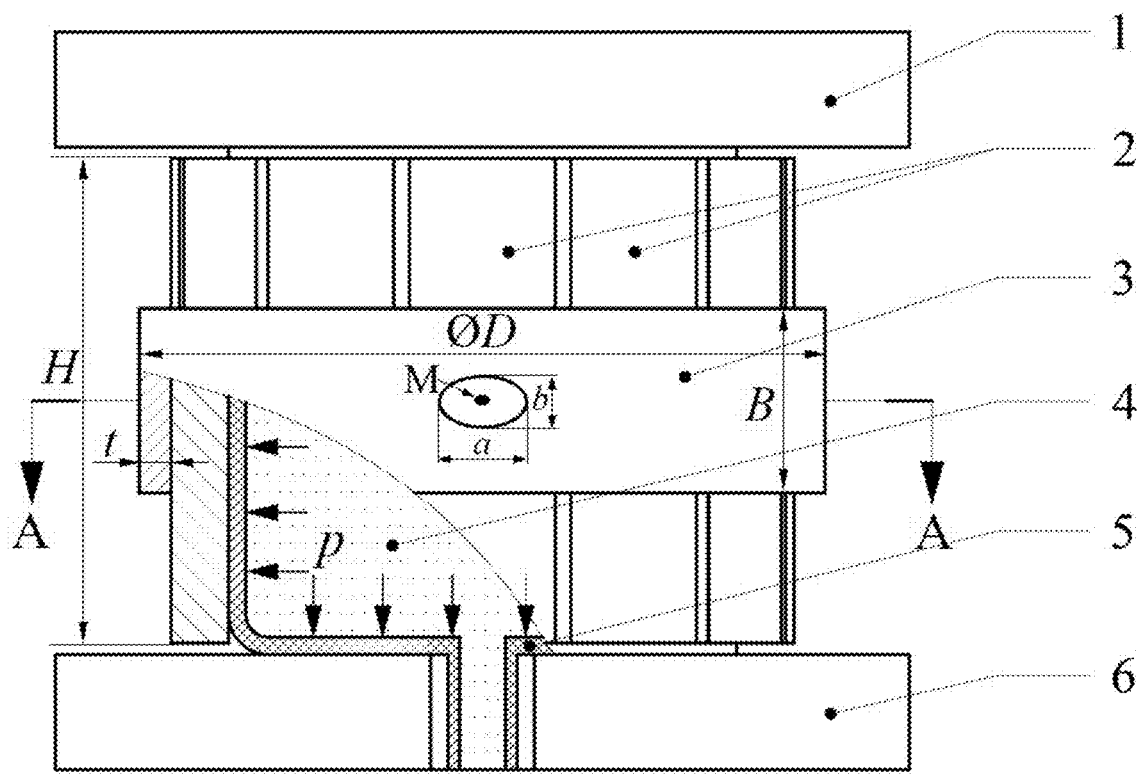
Figure 2:
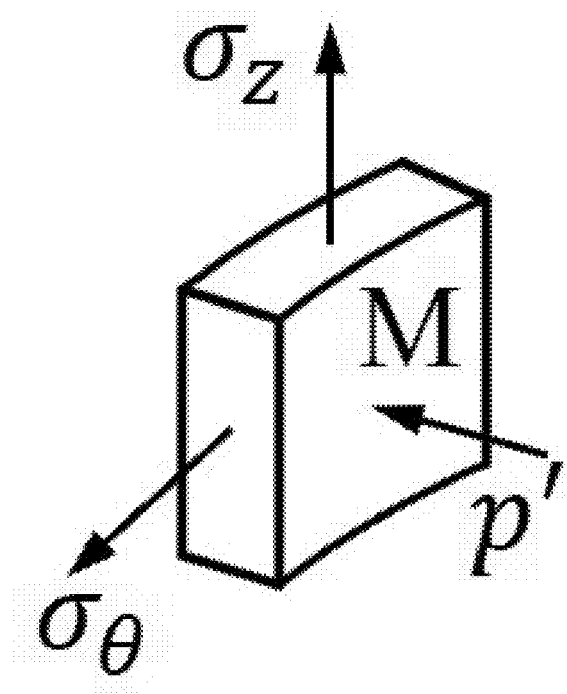
Figure 3:
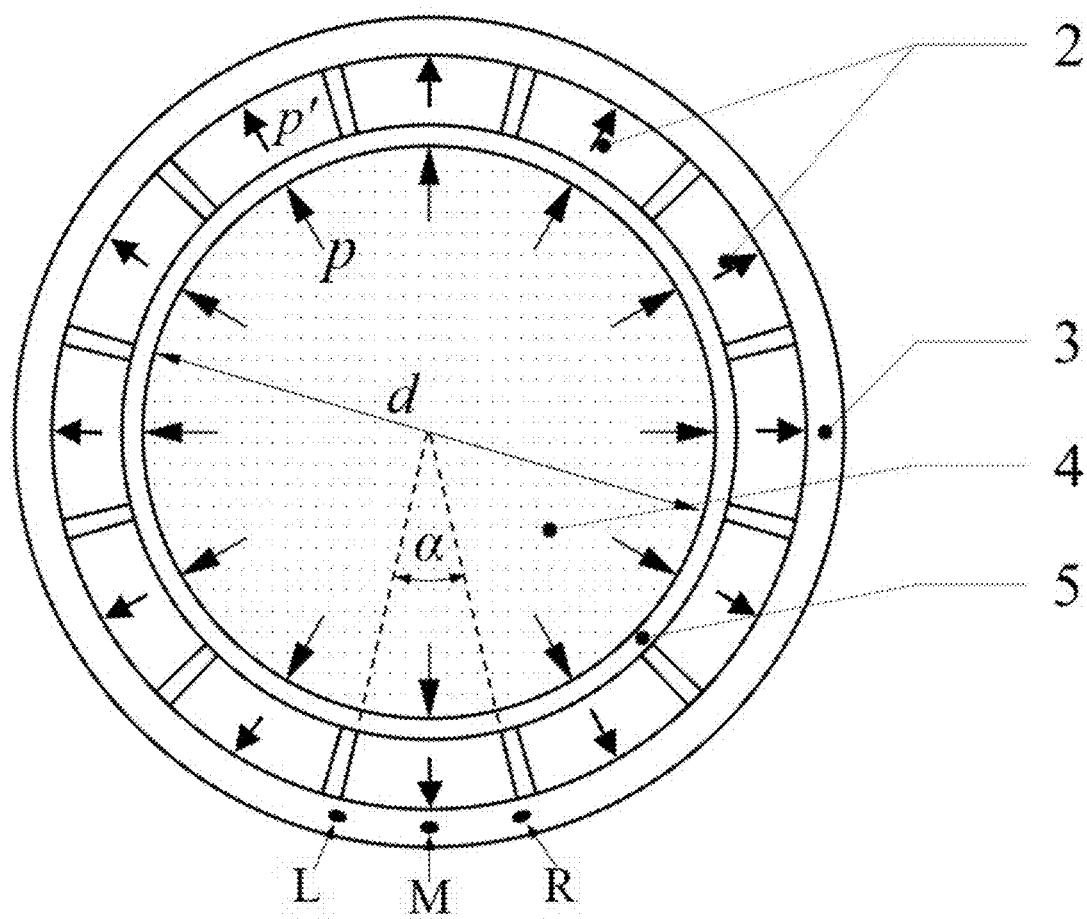
FIG. 3 shows an A-A section in FIG. 2-1 in the embodiment of the present disclosure.

As shown in FIG. 1, FIG. 2-1, FIG. 2-2, and FIG. 3, a plastic strain ratio r-value of a tube in a circumferential direction is measured through uniform pressurization and equal diameter bulging. The basic idea is to apply a fluid medium inside a liquid bag 5. The fluid medium is pressurizing fluid 4. A ring segmented rigid die 2 is driven to move outward uniformly in a radial direction by controlling a fluid pressure p in the liquid bag 5. A contact pressure p' is generated between the ring segmented rigid die 2 and an annular sample 3 of a tube blank, so as to drive equal diameter bulging of the sample 3 (circumferential uniaxial tensile deformation). By measuring the strain at a point M of the annular sample 3 at the corresponding position of a rigid module, the plastic strain ratio r-value in the circumferential direction can be obtained.

Due to the inevitable friction between the annular sample and the ring segmented rigid die, the stress and strain distribution is non-uniform. The friction leads to different circumferential stresses $\sigma_\theta$ at different positions on the annular sample (for example, the circumferential stresses at the points L and R at the edge of the module and the point M at the central position are different), and leads to tensile stresses $\sigma_z$ in the axial direction, which causes the deformation of the sample to deviate from the circumferential uniaxial tensile state. The friction is mainly influenced by three factors: a friction coefficient, a contact envelope angle $\alpha$ between the annular sample and a single module of the ring segmented rigid die (that is to say, the number of segments of the ring segmented rigid die), and a width $B_0$ of the annular sample. The following is a detailed analysis of the conditions to be satisfied for the number of segments of the rigid die and the width of the annular sample of the tube blank when the influence of friction on the uniformity of stress and strain distribution is negligible.

The number of segments of the ring segmented rigid die is assumed to be N, and the contact envelope angle of a single rigid die module is $\alpha=2\pi/N$. The circumferential stress of the annular sample at the edge of the segmented rigid module (as shown in a point R in FIG. 3) is $\sigma_\theta^R$, and the circumferential stress at the middle position of the segmented rigid module (as shown in a point M in FIG. 3) is $\sigma_\theta^M$. $\sigma_\theta^R$ shall be greater than $\sigma_\theta^M$. The friction coefficient between the annular sample and the segmented rigid module is assumed to be $\mu$. The mechanical equilibrium conditions of the region between M and R on the annular sample in the radial and circumferential directions are:

$$\sigma_\theta Bt \sin\frac{d\theta}{2} + (\sigma_\theta + d\sigma_\theta)Bt \sin\frac{d\theta}{2} - p'B\left(\frac{D_0}{2} - t_0\right)d\theta = 0, \text{ and} \quad (1)$$

$$\sigma_\theta Bt \cos\frac{d\theta}{2} + \mu p'B\left(\frac{D_0}{2} - t_0\right)d\theta - (\sigma_\theta + d\sigma_\theta)Bt \cos\frac{d\theta}{2} = 0, \quad (2)$$

where $\sigma_\theta$ is the circumferential stress on the micro element with an included angle $d\theta$. Since the included angle $d\theta$ is very small, $\sin d\theta/2=d\theta/2$ and $\cos d\theta/2=1$, the following can be obtained by sorting out Formulas (1) and (2):

$$\frac{1}{\sigma_\theta}d\sigma_\theta = \mu d\theta. \quad (3)$$

By integrating both sides of the above formula and combining the boundary conditions: when $\theta=\alpha/2=\pi/N$, $\sigma_\theta=\sigma_\theta^R$, an integral constant can be obtained as $C=\ln \sigma_\theta^R - \mu\pi/N$. Therefore, the circumferential stress at any point in the region between M and R can be obtained by the following formula:

$$\frac{\sigma_\theta^R}{\sigma_\theta} = e^{\mu\left(\frac{\pi}{N}-\theta\right)}. \quad (4)$$

When $\theta=0$, $\sigma_\theta=\sigma_\theta^M$, the following can be obtained by substituting it into Formula (4):

$$\frac{\sigma_\theta^R}{\sigma_\theta^M} = e^{\frac{\mu\pi}{N}}. \quad (5)$$

According to Formula (5), the stress ratio $\sigma_\theta^R/\sigma_\theta^M$ between the point R at the edge and the point M in the middle of the rigid module changes with the number of segments N of the ring segmented rigid die, as shown in Table 1. It can be seen from Table 1 that with the increase of the number of segments N, the distribution of circumferential stress gradually tends to be uniform. When the number of segments N reaches 8, the maximum difference of circumferential stress is 8.2%, even if the friction coefficient reaches 0.20. When the number of segments N reaches 12, the maximum difference of circumferential stress is only about 5%. Further increase of N does not significantly change $\sigma_\theta^R/\sigma_\theta^M$, so the influence of friction on the circumferential stress can be ignored. Therefore, N≥8 is guaranteed in the actual test, and N≥12 is recommended.

TABLE 1

| Stress ratio | Friction coefficient μ | Number of segments of ring segmented rigid die N | | | | | | | | |
|---|---|---|---|---|---|---|---|---|---|---|
| | | 4 | 6 | 8 | 10 | 12 | 14 | 16 | 18 | 20 |
| $\dfrac{\sigma_\theta^R}{\sigma_\theta^M}$ | 0.05 | 1.040 | 1.027 | 1.020 | 1.016 | 1.013 | 1.011 | 1.010 | 1.009 | 1.008 |
| | 0.10 | 1.082 | 1.054 | 1.040 | 1.032 | 1.027 | 1.023 | 1.020 | 1.018 | 1.016 |
| | 0.15 | 1.125 | 1.082 | 1.061 | 1.048 | 1.040 | 1.034 | 1.030 | 1.027 | 1.024 |
| | 0.20 | 1.170 | 1.110 | 1.082 | 1.065 | 1.054 | 1.046 | 1.040 | 1.036 | 1.032 |

As shown in FIG. 2-1 and FIG. 2-2, the circumferential stress $\sigma_\theta$ and axial stress $\theta_z$ generated at the point M during the circumferential tensile deformation of the annular sample of the tube blank can be expressed as:

$$\begin{cases} \sigma_\theta = \dfrac{p'(D-2t)}{2t} \\ \sigma_z = \dfrac{\mu p' B(D_0 - 2t_0)}{2t(D-t)} \\ p' = \dfrac{dH}{(D_0 - 2t_0)B} p \end{cases} \quad (6)$$

Thus, the axial to circumferential stress ratio can be obtained:

$$\dfrac{\sigma_z}{\sigma_\theta} = \dfrac{\mu B(D_0 - 2t_0)}{(D-2t)(D-t)} \approx \dfrac{\mu B D_0}{D^2} \approx \mu \dfrac{B_0}{D_0}. \quad (7)$$

According to Formula (7), changes of the ratio of axial stress $\sigma_z$ to circumferential stress $\sigma_\theta$, $\sigma_z/\sigma_\theta$, with the friction coefficient μ and the width/diameter ratio of the annular sample $B_0/D_0$ are shown in Table 2. As can be seen from Table 2, when $B_0/D_0$ reaches 0.10, even if the friction coefficient reaches 0.20, $\sigma_z/\sigma_\theta$ is 0.02, that is, the axial stress is only 2% of the circumferential stress, and it can be approximately considered that the sample is in a uniaxial tensile stress state. Therefore, it is recommended to use $B_0/D_0 \le 0.10$ in the actual test.

TABLE 2

| Stress ratio | Friction coefficient μ | Width/diameter ratio of annular sample $B_0/D_0$ | | | |
|---|---|---|---|---|---|
| | | 0.05 | 0.10 | 0.15 | 0.20 |
| $\dfrac{\sigma_z}{\sigma_\theta}$ | 0.05 | 0.0025 | 0.005 | 0.0075 | 0.01 |
| | 0.10 | 0.005 | 0.01 | 0.015 | 0.02 |
| | 0.15 | 0.0075 | 0.015 | 0.0225 | 0.03 |
| | 0.20 | 0.01 | 0.02 | 0.03 | 0.04 |

In addition, when the r-value of the tube in the circumferential direction is measured using uniform pressurization and equal diameter bulging, the ring segmented rigid die and the inner surface of the annular sample can be fully lubricated to reduce the friction coefficient μ as much as possible. Therefore, the uniformity of stress and strain can be further improved, and the stress state on the annular sample of the tube during uniform pressurization and equal diameter bulging is almost close to the circumferential uniaxial tension.

During uniform pressurization and equal diameter bulging, the grid with a size of $a_0 \times b_0$ at the point M on the annular sample of the tube is deformed into a grid with a size of $a \times b$, and the strain generated in the circumferential direction here is $\varepsilon_\theta = \ln(a/a_0)$ and the strain in the width direction is $\varepsilon_z = \ln(b/b_0)$. According to a constant volume condition, the plastic strain ratio in the circumferential direction can be obtained:

$$r_\theta = \dfrac{\varepsilon_z}{\varepsilon_t} = \dfrac{\varepsilon_z}{-(\varepsilon_z + \varepsilon_\theta)} = \dfrac{\ln(b/b_0)}{\ln(a_0 b_0 / ab)}. \quad (8)$$

Figure 4:
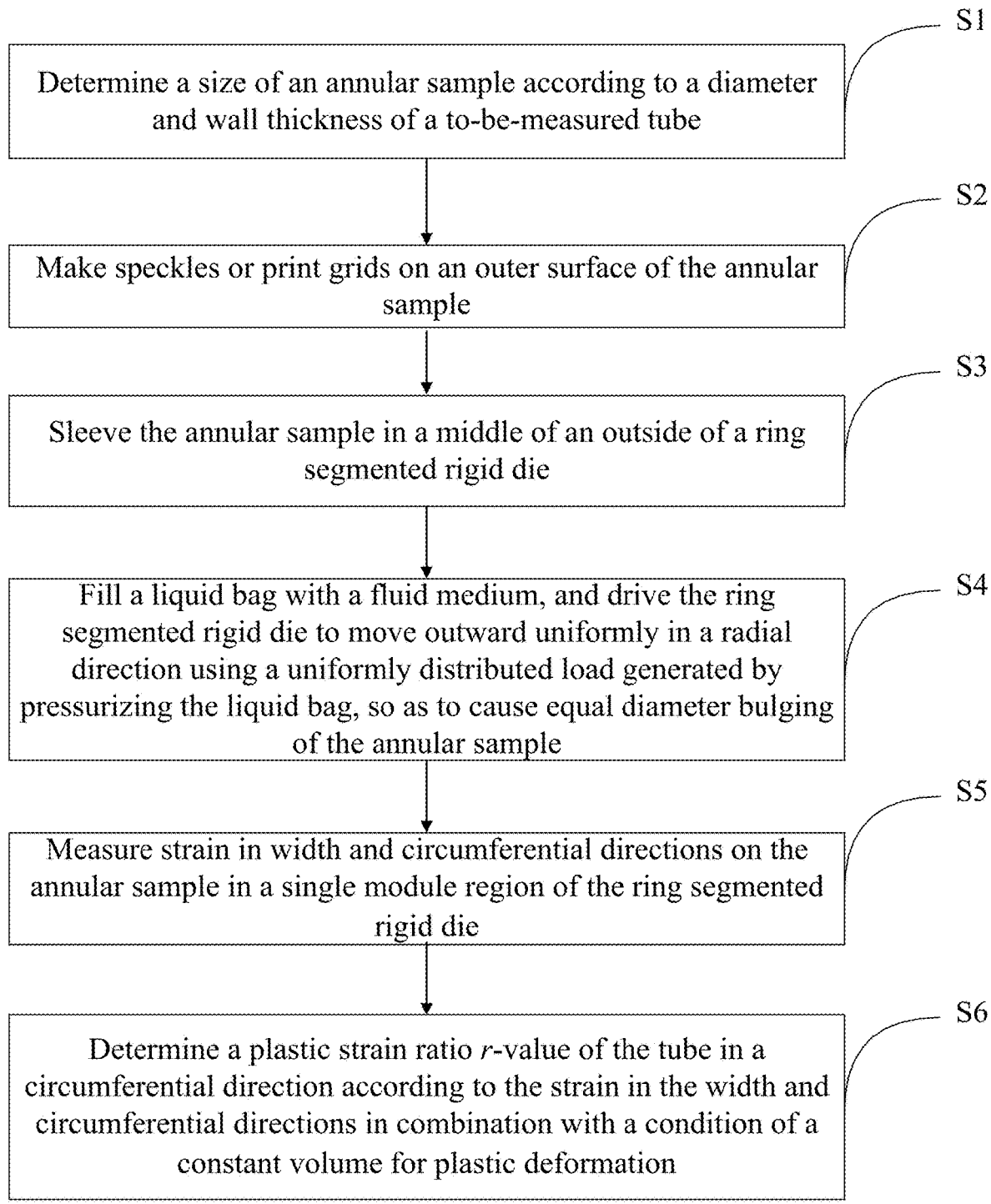
FIG. 4 is a flow chart of a method for directly measuring the r-value of the tube in the circumferential direction through uniform pressurization and equal diameter bulging in the embodiment of the present disclosure.

The present embodiment is illustrated with reference to FIG. 1 to FIG. 4. FIG. 1 is a schematic diagram of an initial stage of testing an r-value of a tube in a circumferential direction through uniform pressurization and equal diameter bulging in an embodiment of the present disclosure. FIG. 2-1 is a schematic diagram of an intermediate deformation stage of testing the r-value of the tube in the circumferential direction through uniform pressurization and equal diameter bulging in the embodiment of the present disclosure. FIG. 3 shows an A-A section in FIG. 2-1 in the embodiment of the present disclosure. FIG. 4 is a flow chart of a method for directly measuring the r-value of the tube in the circumferential direction through uniform pressurization and equal diameter bulging in the embodiment of the present disclosure. The measuring method specifically includes the following steps.

Step S1: A size of an annular sample is determined according to a diameter and wall thickness of a to-be-measured tube, and the annular sample is cut from the tube.

Step S2: Speckles are made or circular grids are printed on an outer surface of the annular sample.

Step S3: The annular sample is sleeved in a middle of an outside of a ring segmented rigid die.

Step S4: A liquid bag is filled with a fluid medium and an internal pressure is controlled, and the ring segmented rigid die is driven to move outward uniformly in a radial direction using a uniformly distributed load generated by pressurizing the liquid bag, so as to cause equal diameter bulging of the annular sample.

Step S5: Strain in width and circumferential directions on the annular sample in a single module region of the ring segmented rigid die is measured.

Step S6: The plastic strain ratio $r_\theta$ in the circumferential direction of the tube is determined according to the strain in the width and circumferential directions in combination with a condition of a constant volume for plastic deformation.

The steps are described in detail below.

Step S1: A size of an annular sample is determined according to a diameter and wall thickness of a to-be-measured tube, and the annular sample is cut from the tube. The to-be-measured tube is a metal tube or non-metal tube with a diameter of $D_0$. $D_0$ generally needs to be greater than 10 mm. Otherwise, it cannot be processed due to the small size of the ring segmented rigid die and liquid bag. The thickness is $t_0$, and $t_0$ generally ranges from 0.1 to 20 mm. A width $B_0$ and a diameter $D_0$ of the annular sample 3 are designed to meet $B_0/D_0 \leq 1/10$. The annular sample 3 is cut perpendicular to the axis of the tube by electrospark wire-electrode cutting or laser cutting, and the cut section is polished by sandpaper or grinding head to eliminate the influence of the oxide layer formed in the cutting process on the r-value measurement results.

Step S2: Speckles are made or circular grids are printed on an outer surface of the annular sample, which specifically includes: determining whether to make speckles or print circular grids on the outer surface of the annular sample according to the selected strain test method.

Figure 5:
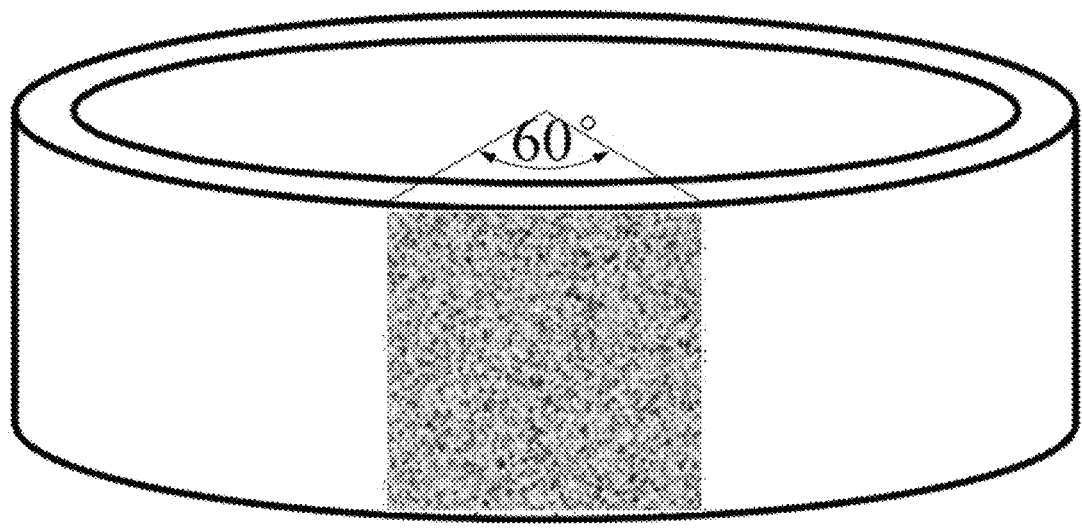
FIG. 5 shows an annular sample with speckles in the embodiment of the present disclosure.

When strain distribution on the surface of the annular sample during deformation is tested using a full-field three-dimensional strain measurement and analysis system (DIC), the outer surface of the annular sample is sprayed with white matte paint within a range of at least 60° to completely cover the surface before testing, and the speckles are uniformly sprayed on the white background with black matte paint, as shown in FIG. 5.

Figure 6:
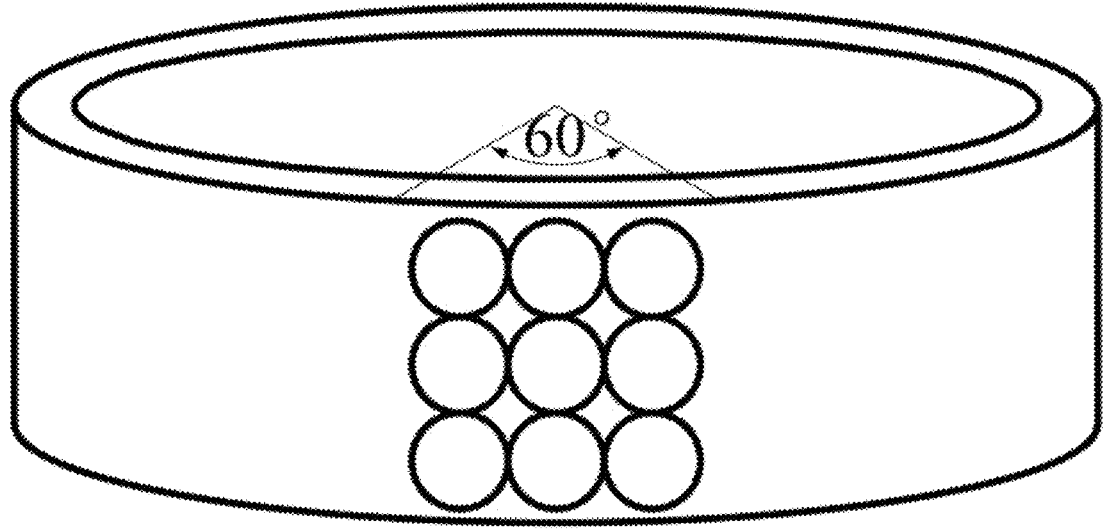
FIG. 6 shows an annular sample printed with circular grids in the embodiment of the present disclosure.

When strain distribution on the surface of the sample during deformation is tested using the traditional grid strain analysis and testing system such as the automated strain analysis and measurement environment (ASAME), 3 to 10 circular grids with a diameter of 1-5 mm are printed on the outer surface of the annular sample within a range of at least 60° by an electrolytic corrosion method before testing, as shown in FIG. 6.

Step S3: The annular sample is sleeved in a middle of an outside of a ring segmented rigid die, which specifically includes the following sub-steps.

Step S31: The ring segmented rigid die 2, the liquid bag 5 and the lower limit plate 6 are assembled according to the positions shown in FIG. 1.

Step S32: The annular sample 3 is sleeved in the middle position outside the ring segmented rigid die 2 from the top. In order to minimize the influence of friction, a molybdenum disulfide lubricating coating is sprayed on the inner surface of annular sample 3 and the outer surface of the ring segmented rigid die 2. The lubricating coating has a thickness of 10-20 μm.

Step S33: Finally, the upper limit plate 1 is installed on the upper side of the liquid bag 5 and the ring segmented rigid die 2.

Step S4: A liquid bag is filled with a fluid medium and an internal pressure is controlled, and the ring segmented rigid die is driven to move outward uniformly in a radial direction using a uniformly distributed load generated by pressurizing the liquid bag, so as to cause equal diameter bulging of the annular sample, which specifically includes the following sub-steps.

Step S41: The liquid bag is filled with a fluid medium 4 through the inlet of the liquid bag 5. The fluid medium 4 is liquid such as water, emulsion, and hydraulic oil or gas such as air and nitrogen.

Step S42: A pressurizing device is used to pressurize the fluid medium 4 inside the liquid bag and control its pressure p. Under the action of internal pressure. The liquid bag 5 generates a uniformly distributed load under the internal pressure, which drives the ring segmented rigid die 2 to move outward uniformly in the radial direction, and the ring segmented rigid die 2 drives the annular sample 3 to undergo equal diameter bulging.

Step S5: Strain in width and circumferential directions on the annular sample in single module region of the ring segmented rigid die region is measured, which specifically includes the following sub-steps.

Strain $\varepsilon_\theta$ in a circumferential direction and strain $\varepsilon_z$ in a width direction in a speckle region on the surface of the annular sample 3 are tested in real time using a full-field three-dimensional strain measurement and analysis system (DIC) during deformation.

Strain $\varepsilon_\theta$ in a circumferential direction and strain $\varepsilon_z$ in a width direction of the grids printed on the surface of the annular sample 3 are tested using the traditional grid strain analysis and testing system such as the ASAME after deformation.

Step S6: The plastic strain ratio $r_\theta$ in the circumferential direction of the tube is determined according to the strain in the width and circumferential directions in combination with a condition of a constant volume for plastic deformation, which specifically includes the following sub-steps.

Step S61: When the strain is tested using the full-field three-dimensional strain measurement and analysis system (DIC), the following operations are performed.

Step S611: 3 to 5 typical points are selected in the measured speckle region to extract the circumferential strain $\varepsilon_\theta$-width-direction strain $\varepsilon_z$ path of each typical point during deformation.

Step S612: Combined with a condition of a constant volume for plastic deformation $\varepsilon_t=-(\varepsilon_z+\varepsilon_\theta)$, the $\varepsilon_z$-$\varepsilon_t$ path of each typical point during deformation is drawn, and the $\varepsilon_z$-$\varepsilon_t$ path at each typical point is linearly fitted. The slope of the fitting line is the ratio $\varepsilon_z/\varepsilon_\theta$ of the width-direction strain to the thickness-direction strain, that is, the plastic strain ratio $r_\theta$ at a typical point.

Step S613: The plastic strain ratios at the selected typical points are averaged to determine the plastic strain ratio of the to-be-measured tube in the circumferential direction.

Step S62: When the strain is tested using the traditional grid strain analysis and testing system such as the ASAME, the following operations are performed.

Step S621: After deformation, the data of the circumferential strain $\varepsilon_\theta$ and width-direction strain $\varepsilon_z$ of each circular grid are substituted into Formula (8) to calculate the plastic strain ratio of a single grid position.

Step S622: The plastic strain ratios at the circular grids are averaged to determine the plastic strain ratio of the to-be-measured tube in the circumferential direction.

Figure 7:
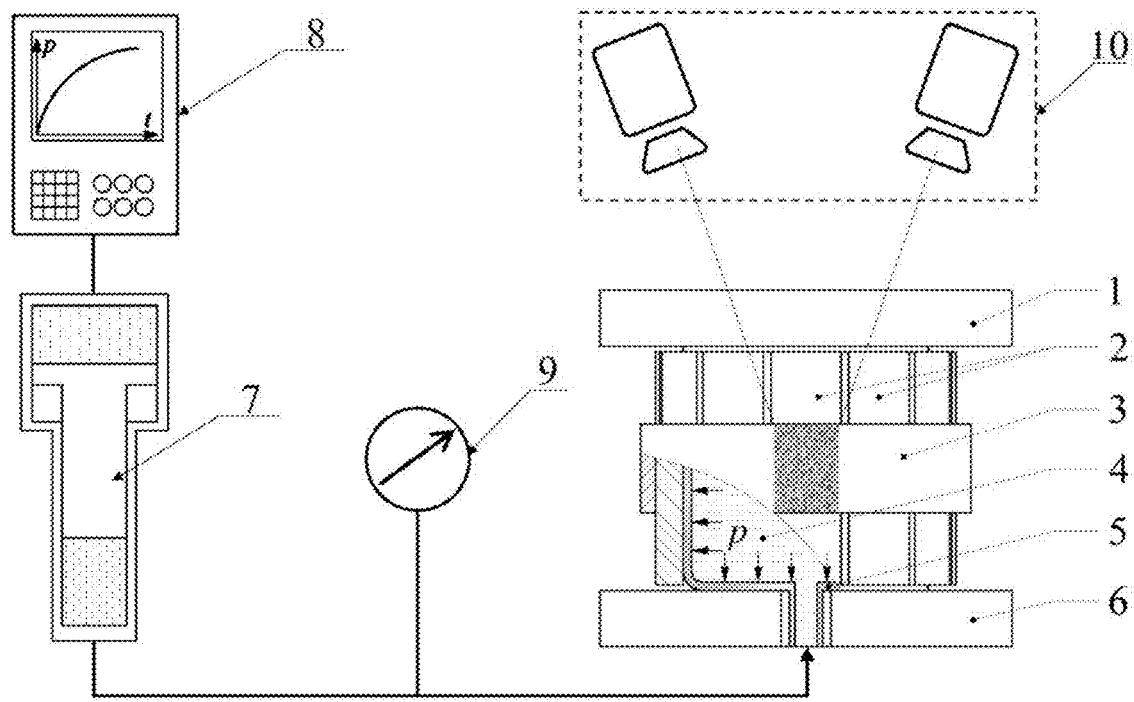
FIG. 7 is a schematic diagram of an experimental device for directly measuring the r-value of the tube in the circumferential direction through uniform pressurization and equal diameter bulging in the embodiment of the present disclosure.

As shown in FIG. 7, the present disclosure further provides a device for directly measuring an r-value of a tube in a circumferential direction through uniform pressurization and equal diameter bulging. The device includes: a ring segmented rigid die 2, a liquid bag 5, an upper limit plate 1 and a lower limit plate 6, a pressurizing and control system, and a strain measurement and data acquisition system 10.

The ring segmented rigid die 2 moves outward uniformly in the radial direction under the action of the uniformly distributed load generated by pressurizing the liquid bag 5, so as to apply a normal pressure p' to the internal surface of the annular sample 3, thereby causing equal diameter bulging of the annular sample 3 (circumferential uniaxial tensile stress state). The number of segments N of the ring segmented rigid die 2 is at least 8, and N≥12 is recommended.

The liquid bag 5 is composed of elastomers such as rubber or polyurethane, and is a cylindrical elastic sac with one end completely closed and the other end provided with a liquid filling port. It has a thickness of 0.5-20 mm, which shall be set to ensure that it is not extruded from the gap between the ring segmented rigid die during bulging. The pressurizing fluid 4 is stored in the liquid bag 5. Under the action of the pressurizing fluid 4, a uniformly distributed load is generated, which is configured to drive the ring segmented rigid die 2 to move outward uniformly.

The upper limit plate 1 and the lower limit plate 6 are configured to limit the movement and deformation of the liquid bag 5 in the axial direction to prevent the liquid bag 5 from bulging and cracking on both sides of the axial direction under the action of the pressurizing fluid medium 4.

The pressurizing and control system includes a pressurizer 7, a pressure control system 8 and a fluid pressure sensor 9, and is configured to fill the liquid bag 5 with the pressurizing fluid medium 4 and control its pressure. The pressurizer 7 is configured to fill the fluid medium and pressurize. The pressure control system 8 is configured to control the pressure inside the liquid bag 5. The fluid pressure sensor 9 is configured to measure and display the pressure and feed it back to pressure control system 8 in real time.

The strain measurement and data acquisition system 10 is configured to measure the strain on the surface of the annular sample using the full-field three-dimensional strain measurement and analysis system (DIC) or grid strain analysis system.

The liquid bag 5 is placed inside the ring segmented rigid die 2, and an initial outer diameter and length of the liquid bag 5 are the same as an inner diameter and length of the ring segmented rigid die 2. The ring segmented rigid die 2 and the liquid bag 5 are clamped between the upper limit plate 1 and the lower limit plate 6. Positions of the upper limit plate 1 and lower limit plate 6 are limited by a moving beam of a universal testing machine or special limiting device. The liquid bag 5 is connected with the pressurizing and control system, including the pressurizer 7, the pressure control system 8 and the fluid pressure sensor 9. The pressurizer 7 applies the pressurizing fluid medium 4 inside the liquid bag 5. The ring segmented rigid die 2 is driven to move outward uniformly in a radial direction using a uniformly distributed load generated by pressurizing the liquid bag 5, so as to cause equal diameter bulging of the annular sample 3 when the ring segmented rigid die 2 moves outward. The strain measurement and data acquisition system 10 is used to measure strain on a surface of the annular sample 3, so as to calculate the r-value of the tube in the circumferential direction.

Specific Solution II

Figure 8:
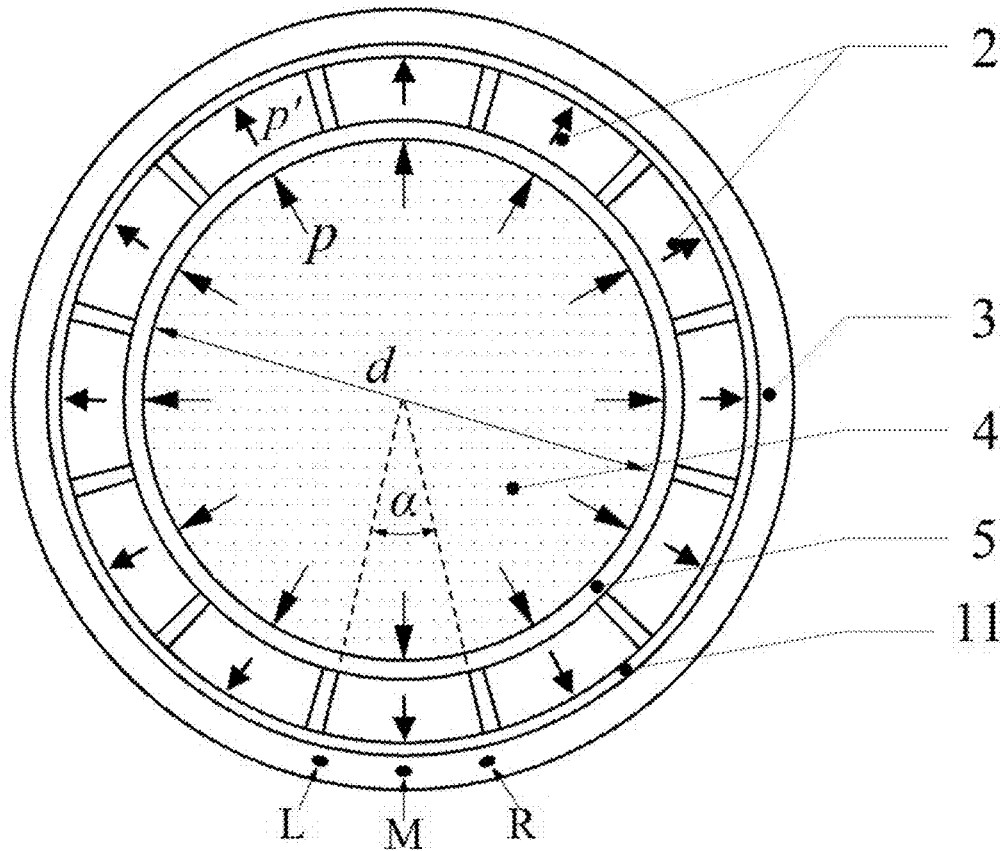
FIG. 8 is a schematic diagram of a lubricating layer arranged between the annular sample and a ring segmented rigid die in the embodiment of the present disclosure.

The difference between this solution and Solution I is that in order to further reduce the influence of friction on the uniformity of stress and strain, a lubricating layer 11 (such as PTFE) is arranged between the annular sample 3 and the ring segmented rigid die 2, as shown in FIG. 8. The lubricating layer 11 is of an annular structure with a thickness of 0.1-5 mm and a width at least 20% greater than that of the annular sample $B_0$. The rest is the same as that in Solution I.

Specific Solution III

Figure 9:
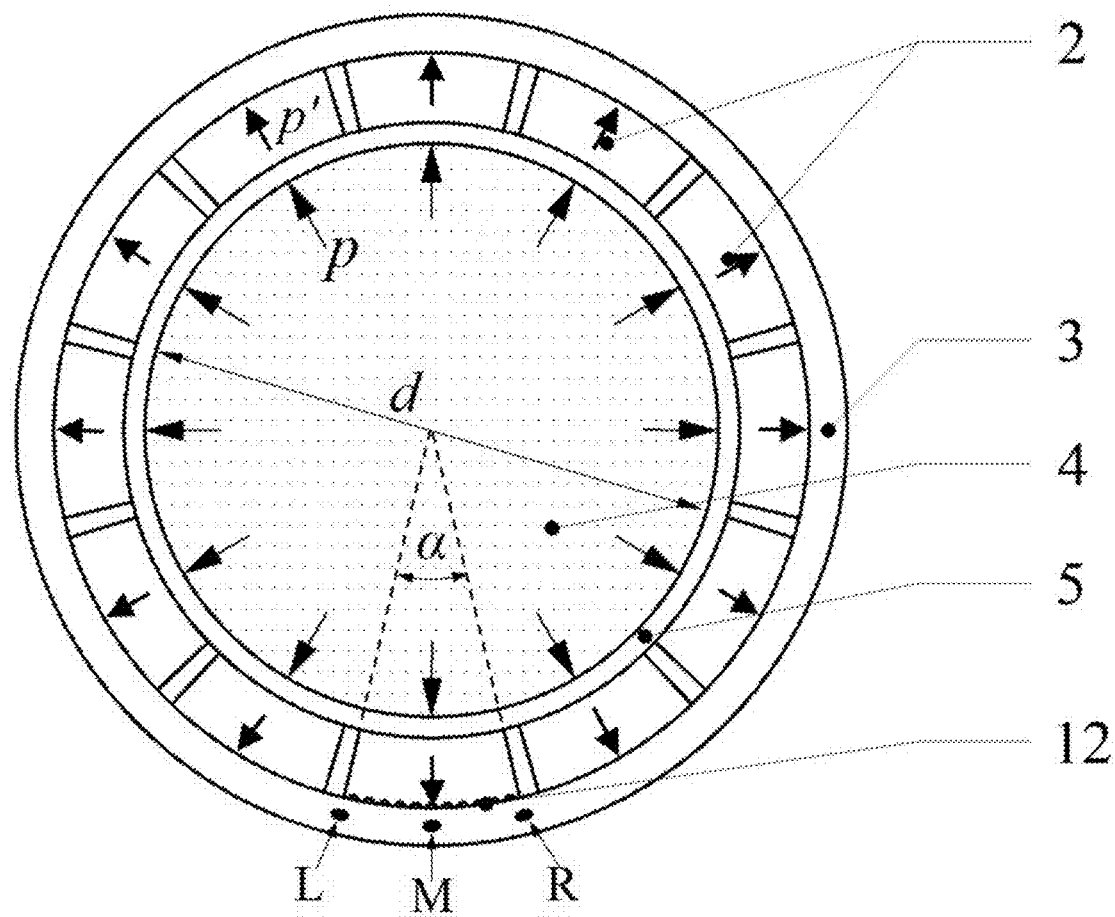
FIG. 9 is a schematic diagram of a microstructure prefabricated on an outer surface of the ring segmented rigid die in the embodiment of the present disclosure.

The difference between this solution and Solution I is that in order to further reduce the influence of friction on the uniformity of stress and strain, a microstructure is prefabricated on the surface of the ring segmented rigid die 2, as shown in FIG. 9. The surface microstructure can be corrugated in the circumferential or axial direction or cross-corrugated in the circumferential and axial direction, or it can also be other surface lattice structures which can reduce the contact area and friction. The rest is the same as that in Solution I.

The present disclosure is further explained in combination with specific embodiments below.

Embodiment 1: The measurement of the plastic strain ratio $r_\theta$ of the thin-walled 5A02 aluminum alloy tube in a circumferential direction is taken as an example. The outer diameter of the tube blank is $D_0=63$ mm and the wall thickness is $t_0=2.0$ mm.

Step I: According to the outer diameter $D_0=63$ mm of the to-be-measured tube, the width $B_0$ of the annular sample is designed to meet $B_0/D_0=1/10$, and the width of the annular sample is determined to be $B_0=6.3$ mm. The annular sample is cut perpendicular to the axis of the tube by electrospark wire-electrode cutting, and the cut section is polished by sandpaper to eliminate the influence of the oxide layer formed in the cutting process on the measurement results of $r_\theta$.

Step II: The outer surface of the annular sample is sprayed with white matte paint within a range of at least 60° to completely cover the surface before testing, and the speckle patterns are uniformly sprayed on the white background with black matte paint.

Step III: The ring segmented rigid die, the liquid bag and the lower limit plate are assembled as shown in FIG. 1. The inner surface of the annular sample and the outer surface of the ring segmented rigid die are sprayed with Molykote D-321R quick-drying molybdenum disulfide with a coating thickness of at least 10 μm. The annular sample is sleeved in the middle position outside the ring segmented rigid die from the top. The upper limit plate is installed on the upper side of the liquid bag and the ring segmented rigid die, and the position is fixed and restrained by the cross beam of the universal testing machine.

Step IV: The pressurizer is used to fill the emulsion into the liquid bag and the pressure control system is used to control the linear increase of the internal pressure p. The ring segmented rigid die is driven to move outward uniformly in a radial direction using a uniformly distributed load generated by pressurizing the liquid bag, so as to cause equal diameter bulging of the annular sample until the annular sample breaks.

Step V: The strain $\varepsilon_\theta$ in a circumferential direction and the strain $\varepsilon_z$ in a width direction in a speckle region on the surface of the 5A02 annular sample are tested in real time using the full-field three-dimensional strain measurement and analysis system (DIC).

Figure 10:
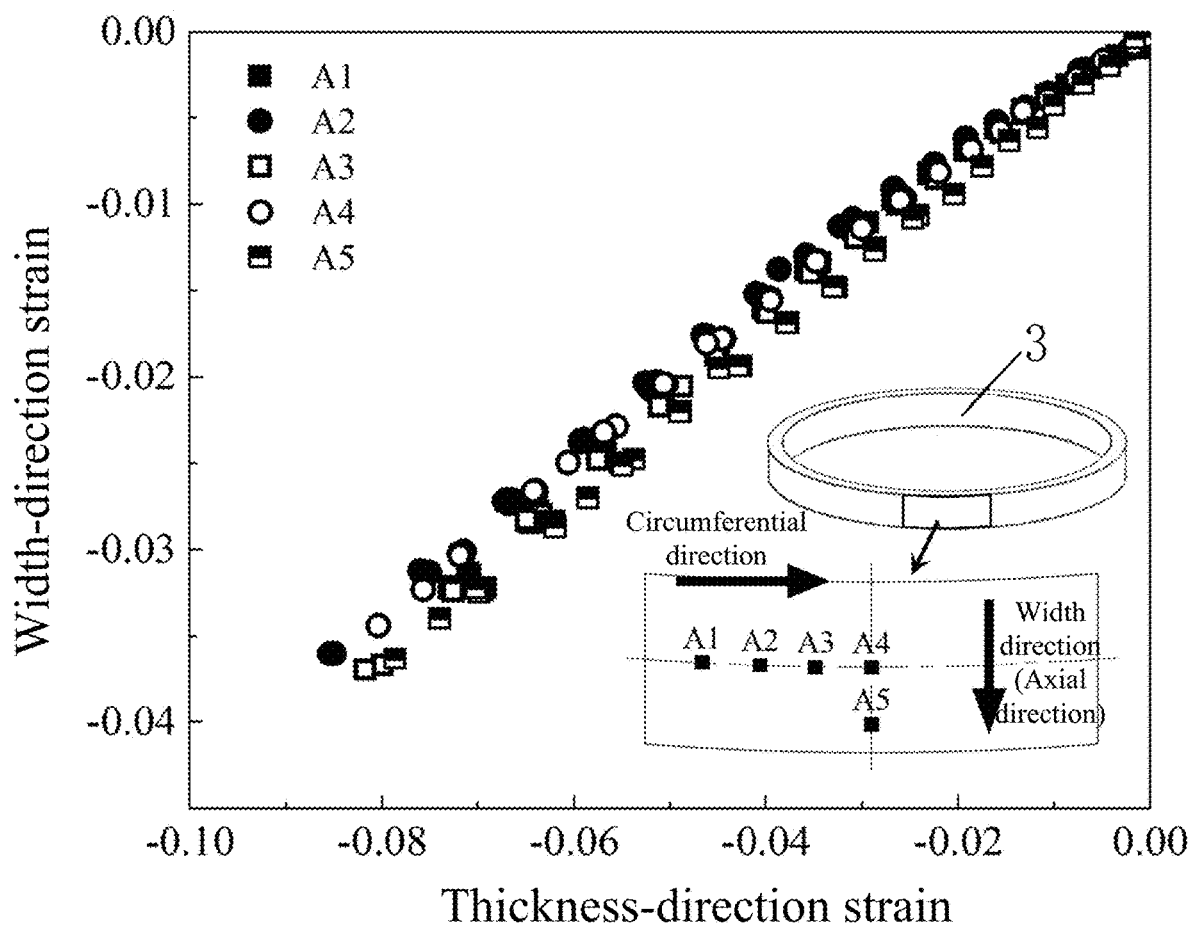
FIG. 10 shows a width-direction strain $\varepsilon_z$-thickness-direction strain $\varepsilon_t$ path of an annular sample of a 5A02 aluminum alloy tube measured by the embodiment of the present disclosure.

Step VI: 5 typical points, A1, A2, A3, A4, and A5, are selected in the measured speckle region (the figure in FIG. 10), and the circumferential strain $\varepsilon_\theta$-width-direction strain $\varepsilon_z$ path of each typical point during deformation is obtained. Combined with a condition of a constant volume for plastic deformation $\varepsilon_t=-(\varepsilon_z+\varepsilon_\theta)$, the $\varepsilon_z$-$\varepsilon_t$ path of each typical point from A1 to A5 during deformation is drawn, as shown in FIG. 10. The $\varepsilon_z$-$\varepsilon_t$ path at each of the 5 typical points is linearly fitted. The slope of the fitting line is the ratio $\varepsilon_z/\varepsilon_\theta$ of the width-direction strain to the thickness-direction strain, that is, the plastic strain ratio $r_\theta$ at a typical point. The plastic strain ratios measured at the 5 typical points are averaged to determine the plastic strain ratio of the to-be-measured tube in the circumferential direction, as shown in Table 3.

TABLE 3

| Tube | $r_\theta$ at typical point | | | | | Average value |
|------|----|----|----|----|----|---------|
|      | A1 | A2 | A3 | A4 | A5 |         |
| 5A02 | 0.48 | 0.45 | 0.48 | 0.45 | 0.47 | 0.466 |

Each embodiment of the present specification is described in a progressive manner, each embodiment focuses on the difference from other embodiments, and the same and similar parts between the embodiments may refer to each other.

In the description of the present disclosure, it should be noted that the orientation or positional relationships indicated by the terms "center", "top", "bottom", "left", "right", "vertical", "horizontal", "inside", "outside", etc. are based on the orientation or positional relationships shown in the accompanying drawings, are merely for facilitating the description of the present disclosure and simplifying the description, rather than indicating or implying that an apparatus or element referred to must have a particular orientation or be constructed and operated in a particular orientation, and therefore will not be interpreted as limiting the present disclosure. Furthermore, the terms "first" and "second" are used for descriptive purposes only and are not to be understood as indicating or implying relative importance.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A method for measuring an r-value of a tube in a circumferential direction, comprising the following steps:
    step S1: determine a size of an annular sample according to a diameter and wall thickness of a to-be-measured tube, and cutting the annular sample from the tube;
    step S2: making speckles or printing circular grids on an outer surface of the annular sample;
    step S3: sleeving the annular sample in a middle of an outside of a ring segmented rigid die;
    step S4: filling a liquid bag with a fluid medium and controlling an internal pressure, and driving the ring segmented rigid die to move outward uniformly in a radial direction using a uniformly distributed load generated by pressurizing the liquid bag, so as to cause equal diameter bulging of the annular sample;
    step S5: measuring strain in width and circumferential directions on the annular sample in a single module region of the ring segmented rigid die; and
    step S6: determining the plastic strain ratio r-value of the tube in the circumferential direction according to the strain in the width and circumferential directions in combination with a condition of a constant volume for plastic deformation.

2. The method for measuring an r-value of a tube in a circumferential direction according to claim 1, wherein the to-be-measured tube is a metal tube or non-metal tube, and the to-be-measured tube has a thickness of 0.1-20 mm.

3. The method for measuring an r-value of a tube in a circumferential direction according to claim 1, wherein a width $B_0$ and a diameter $D_0$ of the annular sample meet $B_0/D_0 \leq 1/10$.

4. The method for measuring an r-value of a tube in a circumferential direction according to claim 1, wherein in step S3, a lubricant is sprayed or a lubricating layer is arranged between the ring segmented rigid die and the annular sample, or a microstructure is prefabricated on an outer surface of the ring segmented rigid die.

5. The method for measuring an r-value of a tube in a circumferential direction according to claim 1, wherein in step S2, the outer surface of the annular sample is sprayed with white matte paint within a range of at least 60° to form a white background completely covering the surface, and the speckles are uniformly sprayed on the white background with black matte paint, and in step S5, the strain in the width and circumferential directions on the surface of the sample are tested in real time using a full-field three-dimensional strain measurement and analysis system.

6. The method for measuring an r-value of a tube in a circumferential direction according to claim 1, wherein in step S2, the circular grids with a diameter of 1-5 mm are printed on the surface of the sample by an electrolytic corrosion method, and in step S5, the strain in the width and circumferential directions on the surface of the annular sample is obtained using a grid strain analysis and testing system.

7. A device for measuring an r-value of a tube in a circumferential direction, comprising a strain measurement and data acquisition system and a ring segmented rigid die for nesting an annular sample externally, wherein a liquid bag is placed inside the ring segmented rigid die, and an initial outer diameter and length of the liquid bag are the same as an inner diameter and length of the ring segmented rigid die; an upper limit plate and a lower limit plate are symmetrically arranged at both ends of the ring segmented rigid die, and the ring segmented rigid die and the liquid bag are clamped between the upper limit plate and the lower limit plate; the liquid bag is externally connected with a pressurizing and control system; the pressurizing and control system is able to apply a fluid medium inside the liquid bag; and the strain measurement and data acquisition system is able to measure strain on a surface of the annular sample.

8. The device for measuring an r-value of a tube in a circumferential direction according to claim 7, wherein the liquid bag is a cylindrical elastic sac with one end closed and the other end provided with a liquid filling port; the pressurizing and control system comprises a pressurizer, a pressure control system and a fluid pressure sensor; and the liquid filling port of the liquid bag is connected with the pressurizer through a tubing.

9. The device for measuring an r-value of a tube in a circumferential direction according to claim 7, wherein a number of segments N of the ring segmented rigid die is at least 8.

* * * * *